(12) United States Patent
He

(10) Patent No.: US 12,091,249 B2
(45) Date of Patent: Sep. 17, 2024

(54) WAREHOUSE SHUTTLE VEHICLE

(71) Applicant: BEIJING JINGDONG QIANSHI TECHNOLOGY CO., LTD., Beijing (CN)

(72) Inventor: Weiquan He, Tianjin (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 311 days.

(21) Appl. No.: 17/638,413

(22) PCT Filed: Apr. 1, 2020

(86) PCT No.: PCT/CN2020/082701
§ 371 (c)(1),
(2) Date: Feb. 25, 2022

(87) PCT Pub. No.: WO2021/047167
PCT Pub. Date: Mar. 18, 2021

(65) Prior Publication Data
US 2022/0324647 A1    Oct. 13, 2022

(30) Foreign Application Priority Data
Sep. 9, 2019 (CN) .......................... 201910857686.9

(51) Int. Cl.
*B65G 1/04* (2006.01)
*B65G 1/06* (2006.01)

(52) U.S. Cl.
CPC ........... *B65G 1/0492* (2013.01); *B65G 1/065* (2013.01)

(58) Field of Classification Search
CPC .................................................. B65G 1/0492
See application file for complete search history.

(56) References Cited

U.S. PATENT DOCUMENTS

| 8,790,061 B2 * | 7/2014 | Yamashita ........... B65G 1/0435 414/280 |
| 9,994,394 B2 * | 6/2018 | Masuda ............... B65G 1/0421 |
| 2018/0265297 A1 | 9/2018 | Nakano et al. |

FOREIGN PATENT DOCUMENTS

| CN | 103895999 A | 7/2014 |
| CN | 105522979 A | 4/2016 |

(Continued)

OTHER PUBLICATIONS

"Communication with Supplementary European Search Report", EP Application No. 20863015.2, Aug. 4, 2023, 10 pp.

(Continued)

*Primary Examiner* — Saul Rodriguez
*Assistant Examiner* — Willie W Berry, Jr.
(74) *Attorney, Agent, or Firm* — Myers Bigel, P.A.

(57) ABSTRACT

The present disclosure relates to a warehouse shuttle vehicle, the warehouse shuttle vehicle comprising: a vehicle body; a pallet fork movable relative to the vehicle body to extend from or retract to the vehicle body, the pallet fork the two plate-like components being spaced apart and arranged oppositely to clamp goods therebetween; and a foldable shifting fork mounted on each plate-like component of the pallet fork and movable relative to the plate-like component to switch between a first state and a second state, the shifting fork comprising a first blocking component and a second blocking component connected to the first blocking component, wherein in the first state, the first blocking component and the second blocking component are in sequence in a first direction intersecting the plate-like component, and in the second state, the first blocking component and the second blocking component are stacked and both located at an inner side of the plate-like component, thus improving the prob- (Continued)

lem that the height of a shifting fork influences the storage density of a warehouse in the related art.

9 Claims, 6 Drawing Sheets

(56) References Cited

FOREIGN PATENT DOCUMENTS

| | | |
|---|---|---|
| CN | 107745908 A | 3/2018 |
| CN | 108928609 A | 12/2018 |
| CN | 208468216 U | 2/2019 |
| CN | 208802415 U | 4/2019 |
| CN | 208916747 U | 5/2019 |
| CN | 110203603 A | 9/2019 |
| DE | 202015104093 U1 | 8/2015 |
| IN | 108147033 A | 6/2018 |
| JP | 2017124933 A | 7/2017 |
| WO | 9108164 A1 | 6/1991 |

OTHER PUBLICATIONS

"First Office Action and English language translation", CN Application No. 201910857686.9, Feb. 20, 2021, 15 pp.

"International Search Report and Written Opinion of the International Searching Authority with English language translation", International Application No. PCT/CN2020/082701, Jul. 7, 2020, 12 pp.

* cited by examiner

WAREHOUSE SHUTTLE VEHICLE

CROSS-REFERENCE TO RELATED APPLICATIONS

The present disclosure application is a U.S. National Stage Application under 35 U.S.C. § 371 of International Patent Application No. PCT/CN2020/082701, filed on Apr. 1, 2020, which is based on and claims priority to CN application No. 201910857686.9, filed on Sep. 9, 2019, the disclosures of both of which are hereby incorporated by reference in their entireties.

FIELD OF THE DISCLOSURE

The present disclosure relates to the field of warehouse transportation equipment, and in particular, to a warehouse shuttle vehicle.

BACKGROUND OF THE DISCLOSURE

FIG. 1 shows a warehouse shuttle vehicle for transferring goods on a rack in a warehouse in the related art. As shown in FIG. 1, the warehouse shuttle vehicle of the related art includes a vehicle body 1, a pallet fork 2 movable relative to the vehicle body 1 to extend from or retract to the vehicle body 1, and shifting forks 3 mounted on the pallet fork 2. The pallet fork 2 includes two plate-like components arranged oppositely and spaced apart from each other. A length direction of the plate-like components is same as a moving direction of the pallet fork 2 and is horizontal. The shifting forks 3 are rotatable relative to the plate-like components to switch between a first position and a second position. In the first position, the shifting forks 3 are perpendicular to the plate-like components so that goods 4 can move with the pallet fork 2 relative to the vehicle body 1, thereby moving the goods 4 from the rack to the shuttle vehicle or to moving the goods 4 from the shuttle vehicle to the rack. In the second position, the shifting forks 3 are erected on inner sides of the plate-like components The shuttle vehicle travels back and forth longitudinally on the stereoscopic warehouse rack, and pulls out goods from or push goods into a rack depository place by lateral extension and retraction of the pallet fork 2 and raising and dropping of the shifting forks 3 to fetch or store the goods. In the related art, the shifting forks 3 in the second position are erected on the inner sides of the plate-like components, and the height of the shifting forks in the second position needs to be lower than spacing between racks on two sides of the warehouse. To make full use of the storage space of the stereoscopic warehouse, the smaller the tier height of the stereoscopic warehouse rack is, the more layers the whole rack have, and the more goods can be stored. Therefore, the height of the shuttle vehicle, which determines the tire height of the stereoscopic warehouse rack, also determines the storage density of the stereoscopic warehouse.

SUMMARY OF THE DISCLOSURE

According to an aspect of the present disclosure, a warehouse shuttle vehicle is provided, the warehouse shuttle vehicle including:

a vehicle body;

a pallet fork movable relative to the vehicle body to extend from or retract to the vehicle body, the pallet fork including two plate-like components arranged side by side in a horizontal direction, the two plate-like components being spaced apart and arranged oppositely to clamp goods therebetween; and a foldable shifting fork mounted on each plate-like component of the pallet fork and movable relative to the plate-like component to switch between a first state and a second state, the shifting fork including a first blocking component and a second blocking component connected to the first blocking component, wherein in the first state, the first blocking component and the second blocking component are in sequence in a first direction intersecting the plate-like component, and in the second state, the first blocking component and the second blocking component are stacked and embedded inside the plate-like component.

In some embodiments, the second blocking component is connected to the first blocking component and rotatable relative to the first blocking component.

In some embodiments, the warehouse shuttle vehicle further includes a drive part configured to drive the shifting fork to move relative to the pallet fork, the drive part including:

a support mounted on the plate-like component;

a rotating shaft rotatably mounted on the support and connected to the first blocking component to cause the first blocking component to rotate;

a first transmission wheel fixedly connected to the support; and a second transmission wheel rotatably mounted on the first blocking component and fixedly connected to the second blocking component, the second transmission wheel being drivingly connected to the first transmission wheel.

In some embodiments, the warehouse shuttle vehicle further includes a flexible transmission component, which is configured to connect the first transmission wheel and the second transmission wheel.

In some embodiments, the first transmission wheel and the second transmission wheel are both synchronous wheels, and the flexible transmission component is a synchronous belt; or the first transmission wheel and the second transmission wheel are both chain wheels, and the flexible transmission component is a transmission chain; or the first transmission wheel and the second transmission wheel are both gear wheels, and the first transmission wheel and the second transmission wheel are engaged; or the first transmission wheel and the second transmission wheel are both belt pulleys, and the flexible transmission component is a transmission belt.

In some embodiments, a gear ratio of the second transmission wheel and the first transmission wheel is 1:2.

In some embodiments, a first end of the first blocking component is connected to the rotating shaft, and the second transmission wheel is mounted at a second end of the first blocking component.

In some embodiments, the first blocking component and the second blocking component of the shifting fork in the second state are arranged side by side in a direction parallel to the plate-like component.

In some embodiments, the first blocking component and the second blocking component of the shifting fork in the second state are arranged side by side in a thickness direction of the plate-like component.

In some embodiments, the plate-like component is provided with a recess for receiving the shifting fork in the second state.

In application of the technical solution of the present disclosure, when the shifting fork is in the second state, the first blocking component and the second blocking component are stacked and both located at an inner side of the plate-like component, and the first blocking component and the second blocking component of the shifting fork in the second state overlap in a vertical direction, thereby reducing the height of the shifting fork and improving the problem that the height of a shifting fork influences the storage density of a warehouse in the related art.

BRIEF DESCRIPTION OF THE
ACCOMPANYING DRAWINGS

To describe technical solutions in the embodiments of the present disclosure or in the related art more clearly, the drawings to be used in description of the embodiments or the related art will be introduced briefly below. Obviously, the drawings in the following description only represent some embodiments of the present disclosure, and those of ordinary skill in the art can also obtain other drawings based on these drawings without creative work.

REFERENCE NUMERALS

Figure 1:
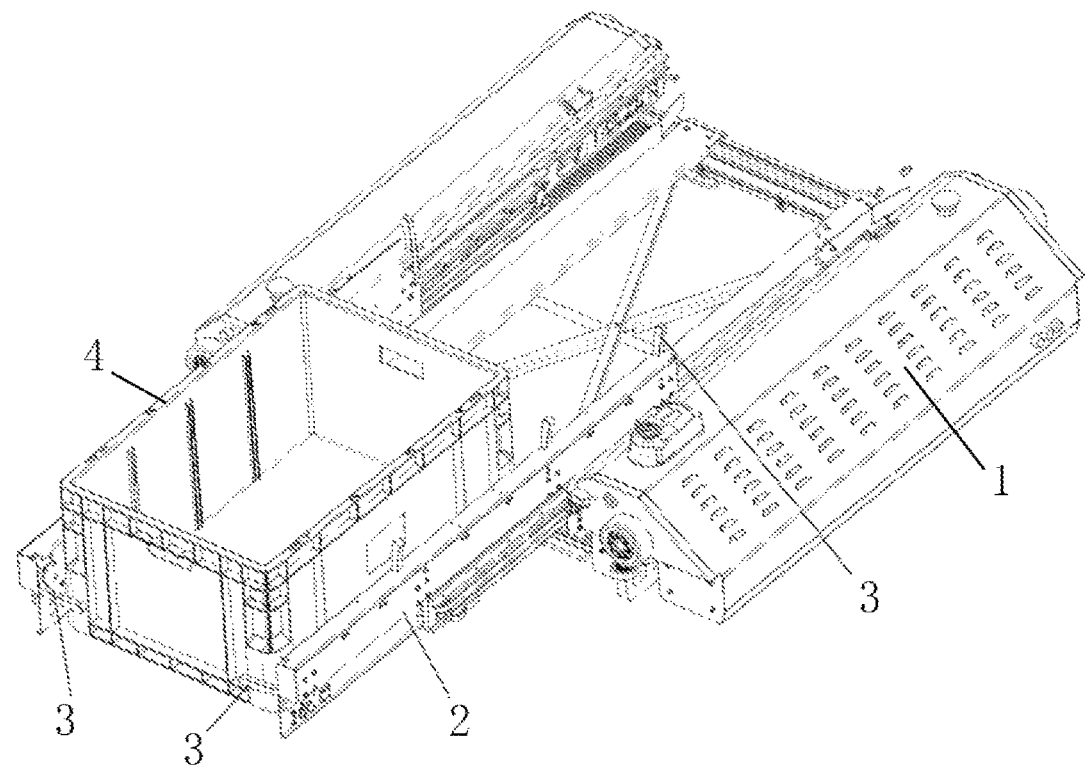
FIG. 1 shows a three-dimensional structural diagram of a warehouse shuttle vehicle of the related art.
Figure 2:
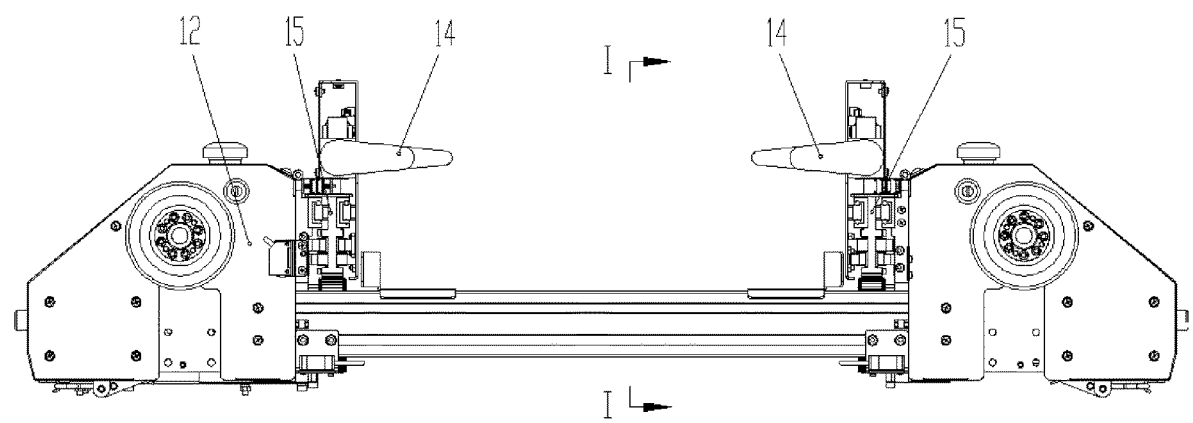
FIG. 2 shows a structural diagram of a warehouse shuttle vehicle in an embodiment of the present disclosure with a shifting fork in a first state.
Figure 3:
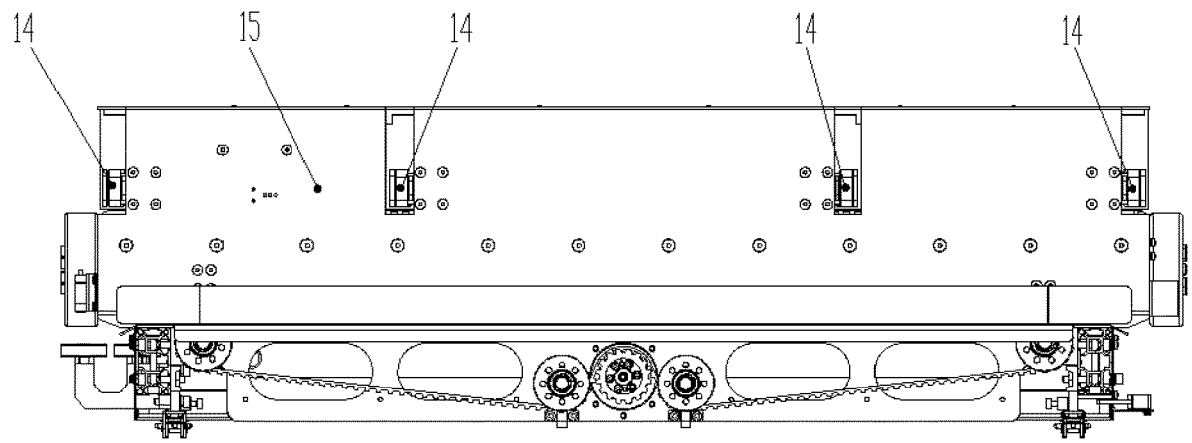
FIG. 3 shows a cross-sectional diagram at I-I in FIG. 2.
Figure 4:
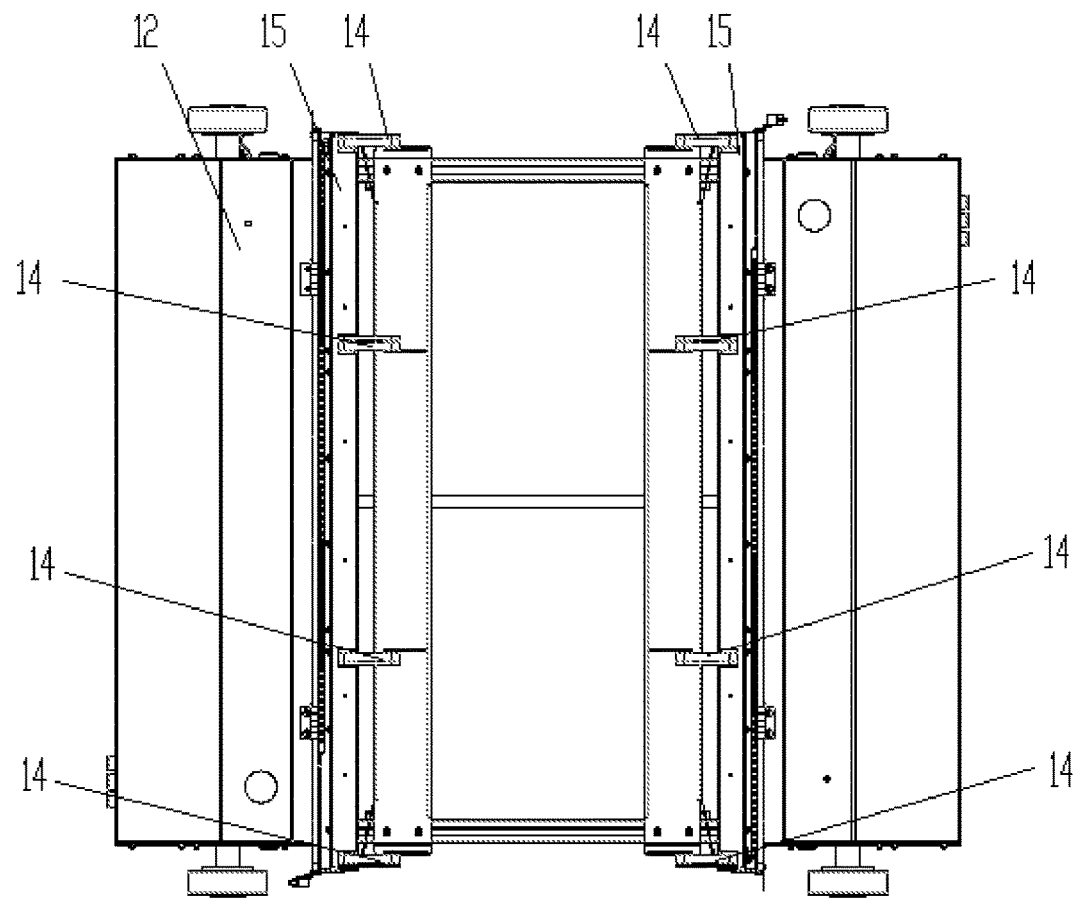
FIG. 4 shows a top-view structural diagram of the warehouse shuttle vehicle shown in FIG. 2.

1—second blocking component; 2—first blocking component; 3—second bearing; 4—pin shaft; 5—second transmission wheel; 6—flexible transmission component; 7—first transmission wheel; 8—rotating shaft; 9—support; 10—first bearing; 11—motor; 12—vehicle body; 14—shifting fork; 15—pallet fork.

DETAILED DESCRIPTION OF THE
PREFERRED EMBODIMENTS

The technical solutions in the embodiments of the present disclosure will be described below clearly and completely in conjunction with the accompanying drawings in the embodiments of the present disclosure. Obviously, the described embodiments are only a part of the embodiments of the present disclosure, and not all the embodiments. The following description of at least one exemplary embodiment is actually only illustrative, and in no way serves as any limitation on the present disclosure and its application or use. All other embodiments obtained by those of ordinary skill in the art without creative work, based on the embodiments in the present disclosure, should fall into the protection scope of the present disclosure.

As shown in FIGS. 2 to 11, a warehouse shuttle vehicle of this embodiment includes a vehicle body 12, a pallet fork 15 movable relative to the vehicle body 12 to extend from or retract to the vehicle body 12, and foldable shifting forks 14 mounted on the pallet fork 15.

The pallet fork 15 includes two plate-like components arranged side by side in a horizontal direction, the two plate-like components being spaced apart and arranged oppositely to clamp goods therebetween.

The shifting fork 14 is movable relative to the plate-like component of the pallet fork 15 to switch between a first state and a second state. As shown in FIGS. 2 to 6, the shifting fork 14 includes a first blocking component 2 and a second blocking component 1 connected to the first blocking component 2. When the shifting fork 14 is in the first state, the first blocking component 2 and the second blocking component 1 are in sequence in a direction intersecting the plate-like component of the pallet fork 15 to enable the goods to move with the movement of the pallet fork 15.

As shown in FIGS. 7 to 10, when the shifting fork 14 is in the second state, the first blocking component 2 and the second blocking component 1 are stacked and embedded inside the plate-like component, and the first blocking component 2 and the second blocking component 1 of the shifting fork 14 in the second state overlap in a vertical direction, thereby reducing the height of the shifting fork 14 and improving the problem that the height of a shifting fork 14 influences the storage density of a warehouse in the related art.

Figure 5:
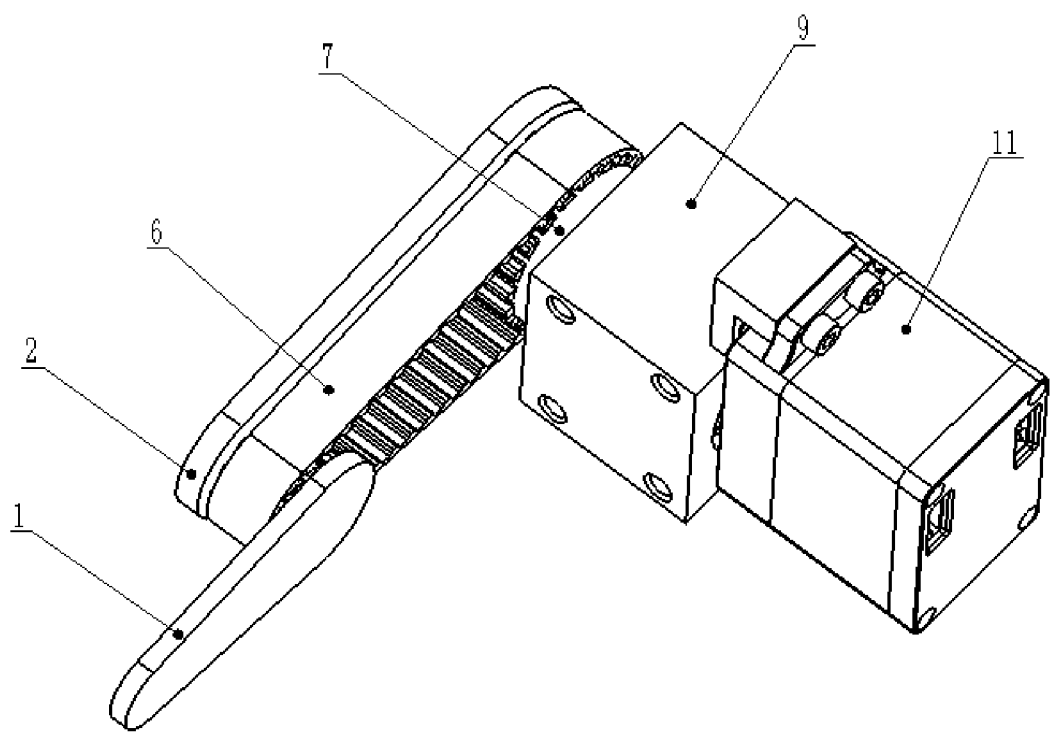
FIG. 5 shows a three-dimensional structural diagram of the shifting fork of the warehouse shuttle vehicle shown in FIG. 2 in an embodiment of the present disclosure.
Figure 6:
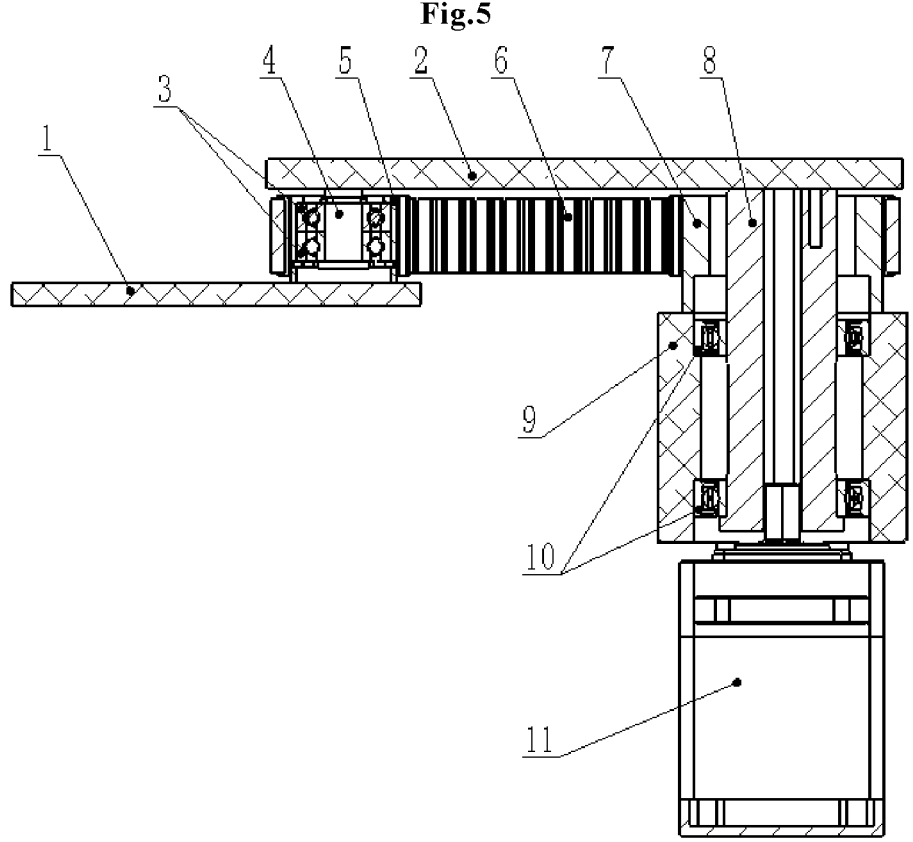
FIG. 6 shows a cross-sectional structural diagram of the shifting fork shown in FIG. 5.
Figure 7:
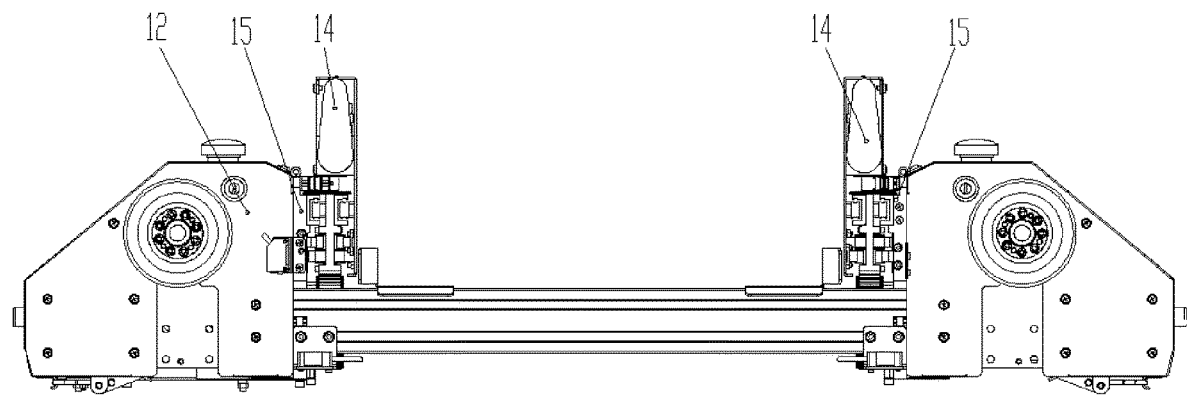
FIG. 7 shows a structural diagram of the warehouse shuttle vehicle in an embodiment of the present disclosure with the shifting fork in a second state.

In conjunction with FIGS. 5 to 6, the warehouse shuttle vehicle also includes a drive part configured to drive the shifting fork 14 to move relative to the pallet fork 15, the drive part including a support 9 mounted on the plate-like component of the shifting fork 15, a rotating shaft 8 rotatably mounted on the support 9, a first transmission wheel 7 fixedly connected to the support 9, a second transmission wheel 5 rotatably mounted to the first blocking component 2, and a flexible transmission component 6 configured to connect the first transmission wheel 7 and the second transmission wheel 5.

The rotating shaft 8 is fixedly connected to the first blocking component 2 to cause the first blocking component 2 to rotate, so that the first blocking component 2 can rotate with the rotation of the rotating shaft 8 from a position of erecting at an inner side of the plate-like component to a position perpendicular to the plate-like component.

The second transmission wheel 5 is in transmission cooperation with the first transmission wheel 7 and is fixedly connected to the second blocking component 1, and an axis of the second transmission wheel 5 is parallel to and spaced apart from an axis of the rotating shaft 8. As the fixedly second transmission wheel 5 and the first transmission wheel 7 fixed to the support 9 are connected by the flexible transmission component, the second transmission wheel 5 can rotate around itself and drive the second blocking component 1 to rotate relative to the first blocking component 2 while the second transmission wheel 5 rotates with the first blocking component 2 around the rotating shaft 8.

Thus, while rotating with the first blocking component 2, the second blocking component 1 can also be driven by the self-rotating second transmission wheel 5 to rotate relative to the first blocking component 2 so that the second blocking component 1 rotates from a first relative position folded with the first blocking component 2 toward a second relative position side-by-side with the first blocking component 2 in the first direction described above.

The drive part also includes a motor 11 connected to the support 9, the motor 11 being configured to cause the rotating shaft 8 to rotate. Preferably, the motor 11 is coaxial with the rotating shaft 8. The support 9 is provided with a through hole that allows the rotating shaft 8 to pass through, and the rotating shaft 8 is fixed in a mounting hole of the support 9 by a first bearing 10.

The first transmission wheel 7 is located at an end of the rotating shaft 8 away from the motor 11 and is fixedly connected to the support 9. The rotating shaft 8 passes through a through hole in the first transmission wheel 7 and is connected to a first end of the first blocking component 2. The second transmission wheel 5 is mounted to a second end of the first blocking component 2. A pin shaft 4 is mounted at the second end of the first blocking component 2, a second bearing 3 is sleeved on the pin shaft 4, and the second transmission wheel 5 is sleeved on the second bearing 3, with an inner ring of the second bearing 3 being connected to the pin shaft 4, and an outer ring of the second bearing 3 being connected to the second transmission wheel 5.

An end of the second blocking component 1 is connected to the second transmission wheel 5, and the rotating shaft 8 rotates to cause the first blocking component 2 to rotate, and while rotating with the fixedly first blocking component 2, the second blocking component 1 is driven by the self-rotating second transmission wheel 5 to rotate, so as to rotate from the position stacked with the first blocking component 2 toward the position side-by-side with the first blocking component 2 in the first direction, such that the shifting fork 14 switches from the second state to the first state.

in some embodiments, the first transmission wheel 7 and the second transmission wheel 5 are both synchronous wheels, and the flexible transmission component 6 is a synchronous belt. In other embodiments, the first transmission wheel 7 and the second transmission wheel 5 are both chain wheels, and the flexible transmission component 6 is a transmission chain. In other embodiments, the first transmission wheel 7 and the second transmission wheel 5 are both gear wheels, and the first transmission wheel 7 and the second transmission wheel 5 are engaged. in other embodiments, the first transmission wheel 7 and the second transmission wheel 5 are both belt pulleys, and the flexible transmission component 6 is a transmission belt.

A gear ratio of the second transmission wheel 5 and the first transmission wheel 7 is 1:2. During rotation of the first blocking component 2 from the vertical direction to a direction perpendicular to the plate-like component, the second blocking component 1 rotates from being stacked with the first blocking component 2 to being arranged side by side with the first blocking component 2 in the direction perpendicular to the plate-like component.

Figure 8:
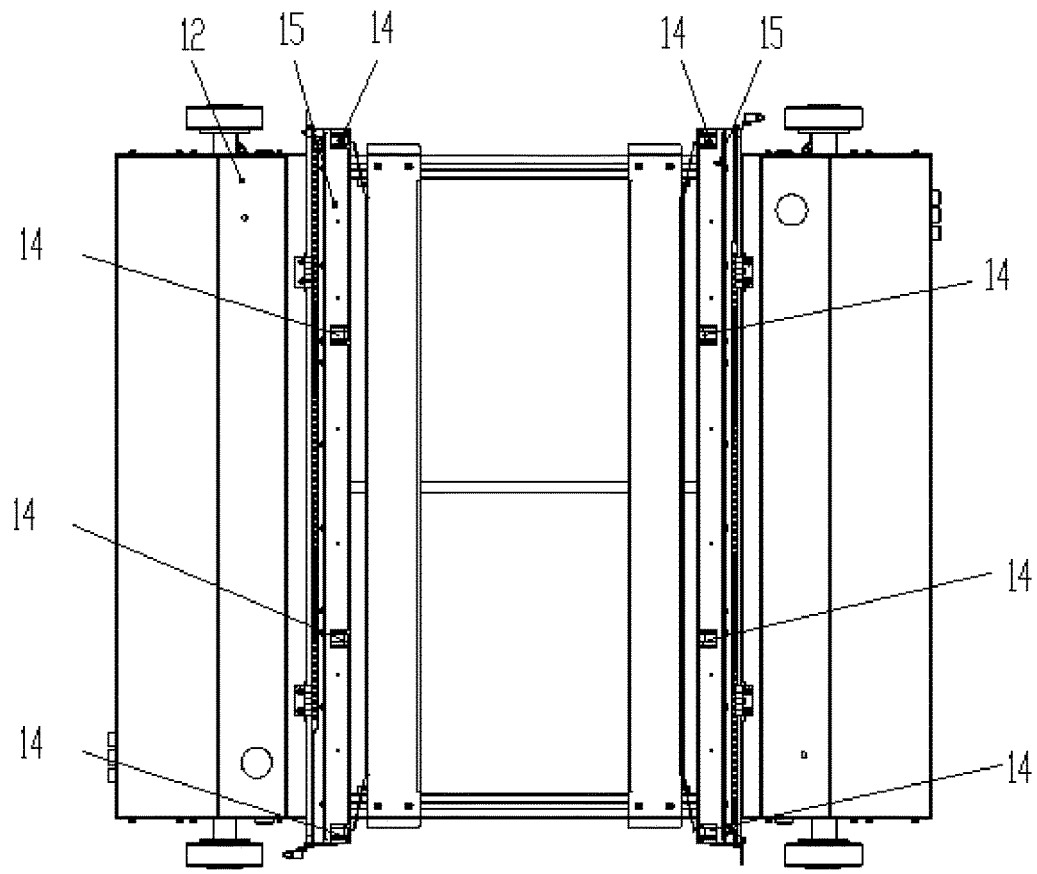
FIG. 8 shows a top-view structural diagram of the warehouse shuttle vehicle shown in FIG. 7.
Figure 9:
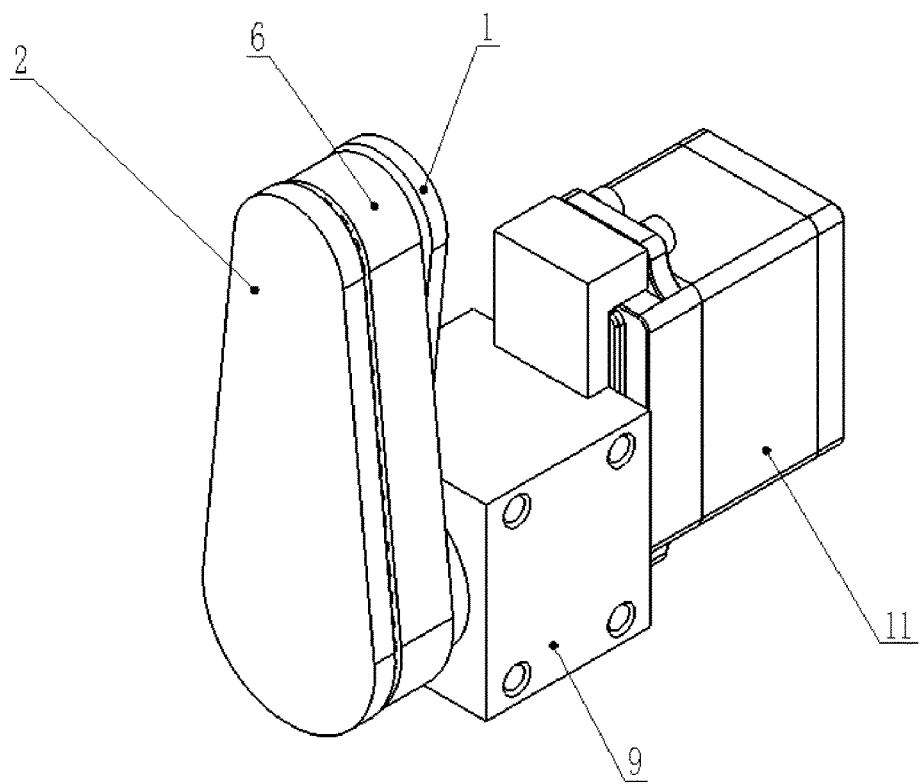
FIG. 9 shows a three-dimensional structural diagram of the shifting fork of the warehouse shuttle vehicle shown in FIG. 7.
Figure 10:
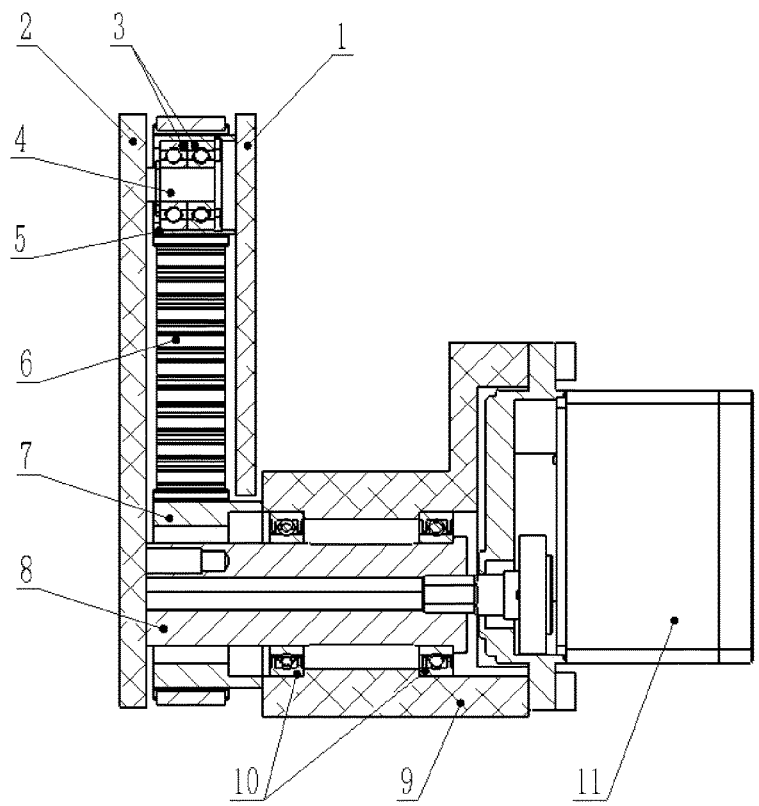
FIG. 10 shows a cross-sectional structural diagram of the shifting fork shown in FIG. 9.
Figure 11:
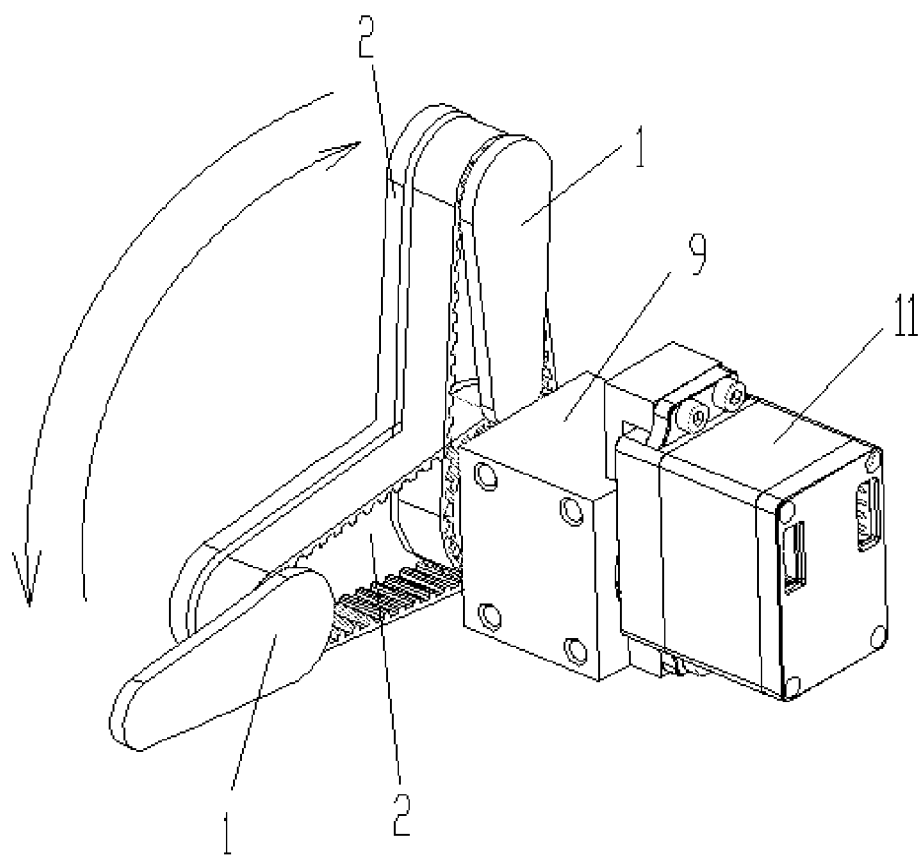
FIG. 11 shows a schematic diagram of the shifting fork in an embodiment of the present disclosure switching between first state and the second state.

As shown in FIGS. 8 to 10, the first blocking component 2 and the second blocking component 1 of the shifting fork 14 in the second state are arranged side by side in a direction parallel to the plate-like component. The plate-like component is provided with a recess for receiving the shifting fork 14 in the second state, and the shifting fork 14 is located in the above-mentioned recess when it is in the second position.

In other optional embodiments, the first blocking component 2 and the second blocking component 1 of the shifting fork 14 in the second state are arranged side by side in a thickness direction of the plate-like component.

As shown in FIGS. 2 to 11, at least two shifting forks 14 are mounted on each of the two plate-like components of the pallet fork 15 of the warehouse shuttle vehicle, and the shifting forks 14 can be raised to the second state and dropped to the first state to achieve pulling out goods from a rack depository place to the shuttle vehicle or pushing goods on the shuttle vehicle into a rack depository place to fetch or store the goods. Each shifting fork 14 can be folded to the interior of the pallet fork 15 when raised and can be fully extended when dropped. A shifting fork assembly includes a second blocking component 1, a first blocking component 2, a second bearing 3, a pin shaft 4, a second transmission wheel 5, a flexible transmission component 6, a first transmission wheel 7, a rotating shaft 8, a support 9, a first bearing 10 and a motor 11, wherein the support 9 is fixedly connected to the extendable plate-like component of the pallet fork 15, the motor 11 is fixedly connected to the support 9, the first bearing 10 is mounted in an inner hole of the support 9, the first transmission wheel 7 is fixedly mounted to the support 9, the rotating shaft 8 is mounted in an inner ring of the first bearing 10, and the rotating shaft 8 is connected to an output shaft of the motor 11 and passes through an inner hole of the first transmission wheel 7 fixedly mounted to the support 9 and is fixedly connected to a first end of the first blocking component 2.

The pin shaft 4 is fixedly connected to a second end of the first blocking component 2, the second bearing 3 is mounted to the pin shaft 4, the second transmission wheel 5 is sleeved on an outer ring of the second bearing 3, and the second transmission wheel 5 can rotate with the second bearing 3 around the pin shaft 4. The second blocking component 1 is fixedly connected to the second transmission wheel 5 and can rotate with the second transmission wheel 5, and the flexible transmission component 6 is wound around the second transmission wheel 5 and the first transmission wheel 7 to form a transmission pair.

The operation of changing the shifting fork from the dropped and extended state to the raised and folded state is implanted in such a manner that the motor 11 drives, by means of the rotating shaft 8, the first blocking component 2 to rotate 90 degrees, and the second transmission wheel 5 fixedly connected to the first blocking component 2 rotates 90 degrees around an axis of the rotating shaft 8 together with the first blocking component 2; at the same time, the second transmission wheel 5 rotates around itself under the action of the transmission pair formed by the second transmission wheel 5, the flexible transmission component 6 and the first transmission wheel 7, thereby causing the second blocking component 1 fixedly connected to the second transmission wheel 5 to rotate together; as a gear ratio of the second transmission wheel 5 and the first transmission wheel 7 is set to 1:2, when the first blocking component 2 rotates 90 degrees, the second blocking component 1 rotates 180 degrees in an opposite direction, such that the second blocking component 1 overlaps with the first blocking component 2 after folded, which reduces the entire height of the shifting fork mechanism, and as they enter the interior of the pallet fork, the height of a vehicle body is not increased.

The operation of changing the shifting fork from the raised and folded state to the dropped and extended state is implemented reversely to the above operation.

Described above are only exemplary embodiments of the present disclosure, which are not intended to limit the present disclosure, and all modifications, equivalent substitutions and improvements made within the spirit and principle of the present disclosure should be encompassed within the protection scope of the present disclosure.

Described above are only exemplary embodiments of the present disclosure, which are not intended to limit the present disclosure, and all modifications, equivalent substitutions and improvements made within the spirit and principle of the present disclosure should be encompassed within the protection scope of the present disclosure.

The invention claimed is:

1. A warehouse shuttle vehicle, comprising:
a vehicle body;
a pallet fork, movable relative to the vehicle body to extend from or retract to the vehicle body, the pallet fork comprising two plate-like components arranged side by side in a horizontal direction, the two plate-like components being spaced apart and arranged oppositely to clamp goods therebetween;
a foldable shifting fork, mounted to the plate-like component of the pallet fork and movable relative to the plate-like component to switch between a first state and a second state, the shifting fork comprising a first blocking component and a second blocking component connected to the first blocking component, wherein in the first state, the first blocking component and the second blocking component are arranged in sequence in a first direction intersecting the plate-like component, and in the second state, the first blocking component and the second blocking component are stacked and embedded inside the plate- like component; and
a drive part, configured to drive the shifting fork to move relative to the pallet fork, the drive part comprising:
a support, mounted to the plate-like component;
a rotating shaft, rotatably mounted to the support and connected to the first blocking component to cause the first blocking component to rotate;
a first transmission wheel, fixedly connected to the support; and
a second transmission wheel, rotatably mounted to the first blocking component and fixedly connected to the second blocking component, the second transmission wheel being drivingly connected to the first transmission wheel.

2. The warehouse shuttle vehicle according to claim 1, wherein the second blocking component is connected to the first blocking component and rotatable relative to the first blocking component.

3. The warehouse shuttle vehicle according to claim 1, further comprising a flexible transmission component, the flexible transmission component being configured to connect the first transmission wheel and the second transmission wheel.

4. The warehouse shuttle vehicle according to claim 3, wherein
the first transmission wheel and the second transmission wheel are both synchronous belt wheels, and the flexible transmission component is a synchronous belt; or
the first transmission wheel and the second transmission wheel are both chain wheels, and the flexible transmission component is a transmission chain; or
the first transmission wheel and the second transmission wheel are both gear wheels, and the first transmission wheel and the second transmission wheel are engaged; or
the first transmission wheel and the second transmission wheel are both belt pulleys, and the flexible transmission component is a transmission belt.

5. The warehouse shuttle vehicle according to claim 4, wherein a gear ratio of the second transmission wheel and the first transmission wheel is 1:2.

6. The warehouse shuttle vehicle according to claim 1, wherein a first end of the first blocking component is connected to the rotating shaft, and the second transmission wheel is mounted at a second end of the first blocking component.

7. The warehouse shuttle vehicle according to claim 1, wherein the first blocking component and the second blocking component of the shifting fork in the second state are arranged side by side in a direction parallel to the plate-like component.

8. The warehouse shuttle vehicle according to claim 1, wherein the first blocking component and the second blocking component of the shifting fork in the second state are arranged side by side in a thickness direction of the plate-like component.

9. The warehouse shuttle vehicle according to claim 1, wherein the plate-like component is provided with a recess for receiving the shifting fork in the second state.

* * * * *